April 29, 1952     R. G. AMES     2,594,606
MASTIC APPLYING AND CORNER FINISHING TOOL
Filed Oct. 9, 1950     3 Sheets-Sheet 1
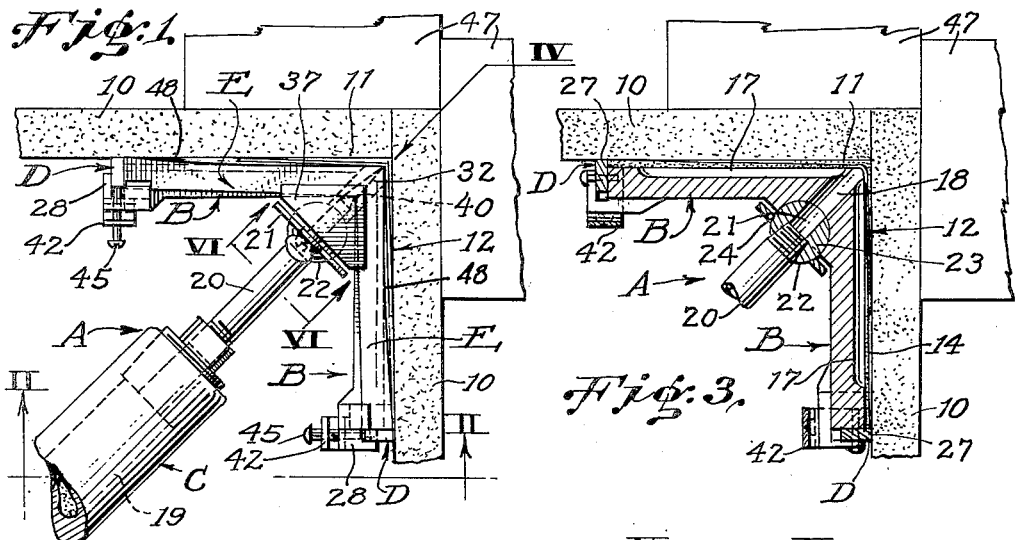
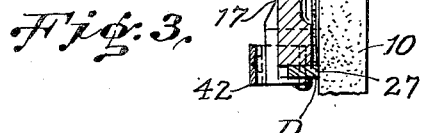
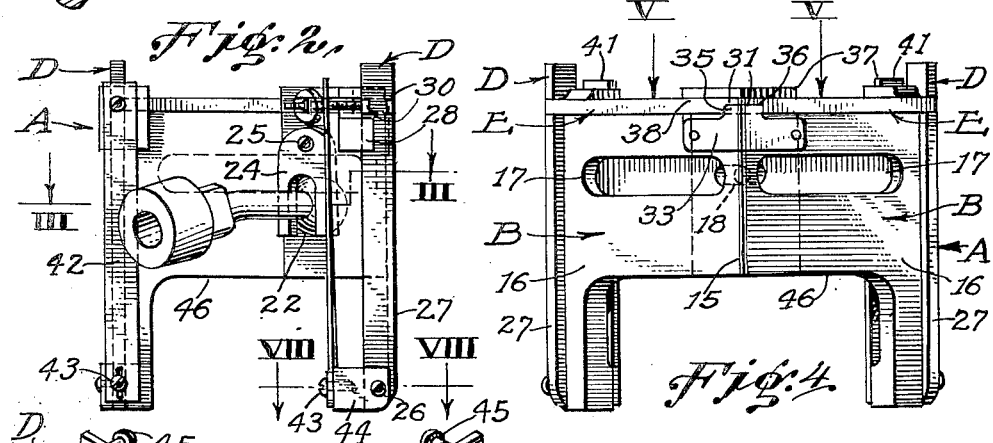
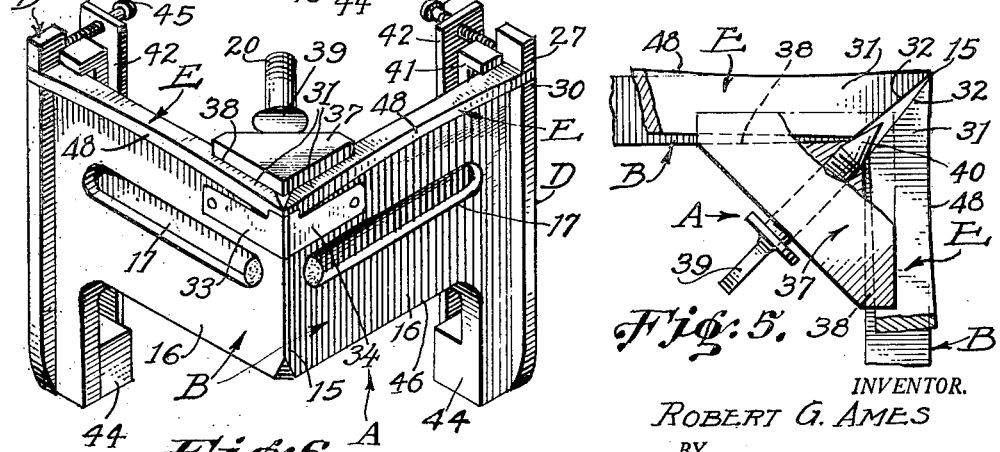
INVENTOR.
ROBERT G. AMES
BY
Munn, Liddy & Glaccum
ATTORNEYS.

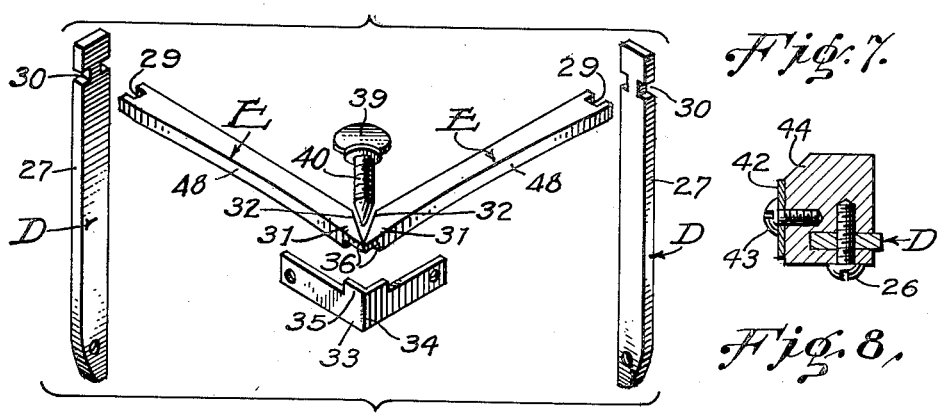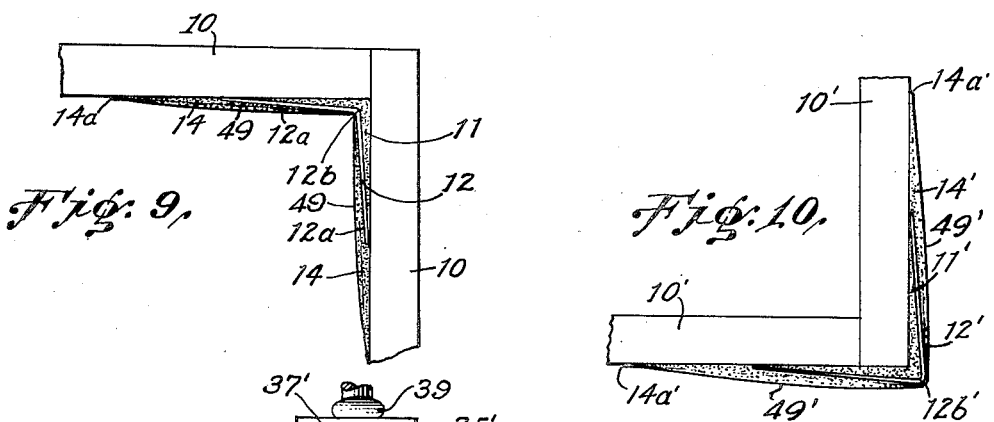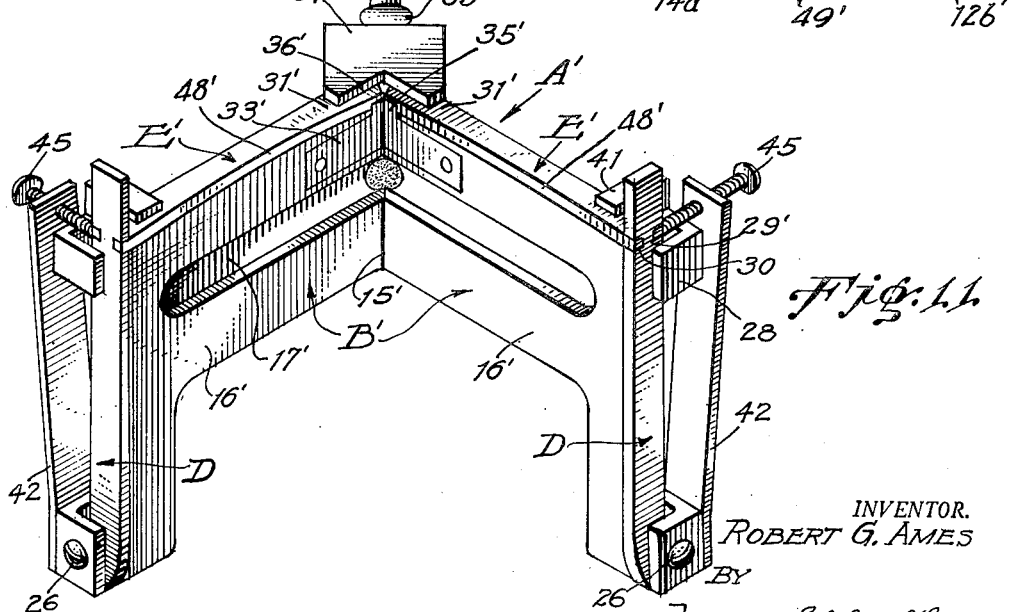

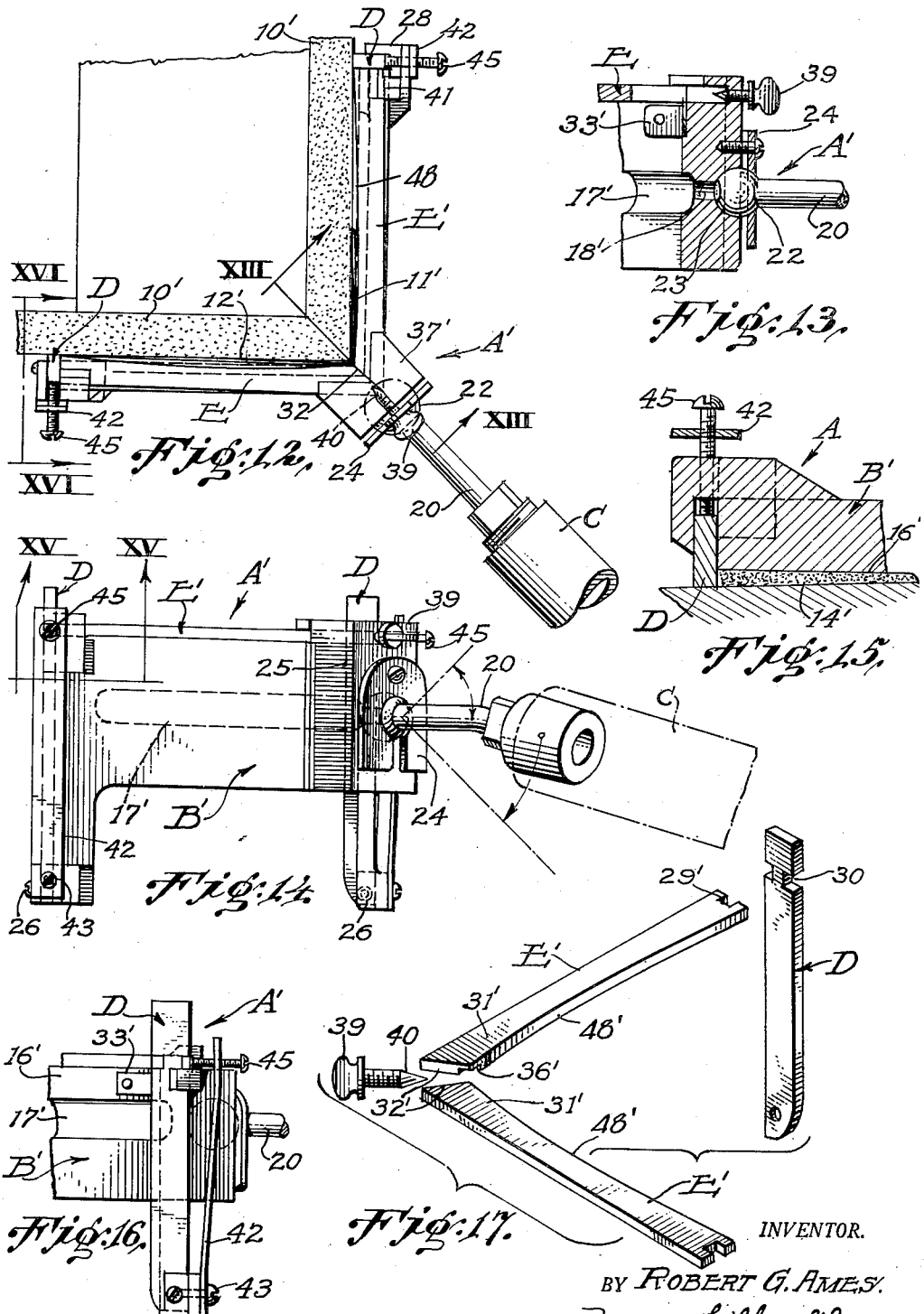

Patented Apr. 29, 1952

2,594,606

UNITED STATES PATENT OFFICE 2,594,606

MASTIC APPLYING AND CORNER FINISHING TOOL

Robert G. Ames, Burlingame, Calif., assignor, by direct and mesne assignments, of one-fifth to George W. Williams and one-fourth to Stanley Ames, both of Burlingame, Calif., and one-tenth to Lois H. Williams Aull, one-tenth to Katherine A. Williams, and one-tenth to George W. Williams, III Application October 9, 1950, Serial No. 189,160

10 Claims. (Cl. 72—130)

The present invention relates to improvements in a mastic-applying and corner finishing tool. It consists of the combinations, constructions, and arrangement of parts, as hereinafter described and claimed.

When using wall board in place of plaster for interior finish of rooms, which is known in the art as "drywall construction," it is necessary to cover the joints with a layer of mastic, over which a tape is applied. Thereafter, the tape is covered by an outer layer of mastic, which is feathered at its edges so as to merge into the wall board surfaces and provide a smooth finish.

In my United States Patent No. 2,502,499 granted April 4, 1950, on a combined tape and mastic applicator, I disclose a tool adapted to apply a layer of mastic to a joint and simultaneously place a tape over this mastic. The tool shown in this patent was designed in such a manner as to spread the mastic over the joint with rapid precision, apply the cover tape thereover, and finish the wall board joint. This patent provides a tape creaser to be used in taping vertical and horizontal inside corners.

It is necessary that the corner tape be covered with a layer of mastic having feathered edges, which will merge into the wall board surfaces, regardless of whether the boards define an inside or an outside corner.

An object of this invention is to provide a tool of the character described, which has a body provided with two angularly-related mastic-applying face plates. The latter are adapted to be moved over the previously-applied tape, delivering the final coating of mastic thereover. The tool may be made for use in an inside corner, or it may be arranged for employment over an outside corner.

It is proposed in this invention to provide yielding mounted longitudinal bars at the lateral edges of the angularly-related face plates so as to limit lateral spreading of the mastic. Also, troweling bars are provided at the trailing edges of these face plates so as to remove excess mastic and smooth out the mastic over the tape.

Experience has shown that a heavy coating of mastic over the crease of the applied tape will dry out and crack. Accordingly, I provide a tool in the present invention that will deposit the necessary thin layer of mastic, covering the flaps of the creased tape and merging into the wall board surfaces. However, mastic is feathered out at the crease and thus the layer of mastic will dry without cracking.

Moreover, I provide a tool in which the longitudinal mastic-retaining bars and the transverse troweling bars are yieldingly mounted so as to compensate for uneven surfaces over which the tool is advanced.

Other objects and advantages will appear as the specification proceeds. The novel features of the invention will be set forth in the claims hereunto appended.

Drawings

For a better understanding of the present invention, reference should be had to the accompanying drawings, forming part of this application, in which:

Figure 1 is a top plan view showing two wall boards forming an inside corner, with one embodiment of my mastic-applying and corner finishing tool arranged in this corner to apply the final layer of mastic over a tape;

Figure 2 is a side elevational view of this tool, as seen from the plane II-II of Figure 1;

Figure 3 is a horizontal sectional view taken along the line III—III of Figure 2;

Figure 4 is a front elevational view of the tool, looking in the direction of the indicating arrow IV in Figure 1;

Figure 5 is a fragmentary plan view, as seen from the plane V—V in Figure 4, parts being shown in section;

Figure 6 is an isometric view of the inside corner tool;

Figure 7 is an isometric view disclosing the longitudinal and transverse bars, fulcrum bracket and pointed screw employed in the inside corner tool;

Figure 8 is a horizontal sectional view taken along the line VIII-VIII of Figure 2;

Figure 9 is a plan view showing a completed inside corner joint provided between two wall boards;

Figure 10 is another plan view of a completed outside corner joint, which has been made by a modified form of my tool, which is disclosed in detail in Figures 11 to 17, inclusive;

Figure 11 is an isometric view of my outside corner tool;

Figure 12 is a plan view illustrating the modified tool as being applied to an outside corner defined by two wall boards;

Figure 13 is a vertical sectional view taken along the line XIII—XIII of Figure 12;

Figure 14 is a side elevational view of Figure 12;

Figure 15 is an enlarged sectional view taken along the line XV—XV of Figure 14;

Figure 16 is a fragmentary elevational view of a portion of the outside corner tool, as seen from the line XVI—XVI in Figure 12; and Figure 17 is an isometric view disclosing one longitudinal mastic-retaining bar and a pair of transverse traveling bars, as used in the outside corner tool, together with a point screw used therein.

While I have shown only the preferred forms of my invention, it should be understood that various changes, or modifications, may be made within the scope of the annexed claims without departing from the spirit thereof.

*Detailed description of first embodiment*

Referring now to Figures 1, 3 and 9, I have illustrated an inside corner joint, which is defined by two wallboards designated at 10. Initially, an inner layer of mastic 11 is applied over this joint, and simultaneously therewith a tape 12 is creased longitudinally and placed over the mastic 11 so as to cover the latter. As shown more clearly in Figure 9, this tape defines flaps 12a extending laterally from the crease 12b.

The tool disclosed in my Patent No. 2,502,499, previously mentioned, is made to apply the inner layer of mastic 11 over the joint and simultaneously place the creased tape thereover. My inside corner tool, which is indicated generally at A, in Figures 1 to 6, inclusive, is adapted for applying a final or outer layer of mastic 14 over the flaps of the previously-placed tape.

As shown in Figure 9, the outer layer of mastic 14 is feathered at its lateral edges 14a so as to merge into the wall board surfaces to provide a smooth finish. Very little mastic, if any, is placed directly over the crease 12b of the tape. The tool A is designed to accomplish this desired result.

In its structural details, the tool A includes a body defining a pair of angularly-related face plates B, which provide a junction 15 therebetween on the outside of the tool (see Figures 4 and 6). These plates are adapted to be arranged in confronting relation with the wall boards 10 with the junction of the plates inserted into the inside corner of the boards; that is, the junction 15 is placed against the crease 12b of the tape.

The mastic that provides the final or outer layer 14 over the tape is delivered to the surfaces 16 that confront the wall boards by grooves 17. The latter communicate with a mastic-discharge bore 18 leading rearwardly through the body of the tool (see Figure 3).

Turning to Figure 1, I have shown a tubular handle C, which is mounted for universal movement between the face plates at the rear of the tool. Mastic under pressure is delivered to the bore 19 of this handle, and is conveyed through a pipe 20 to an opening 21 in a ball 22 (see Figure 3). This ball is retained in its seat 23 by a U-shaped clip 24. In turn, this clip is anchored by a screw 25 to the body of the tool. The mastic flowing through the bore 19 of the handle is conveyed by the pipe 20, through an opening 21 in the ball, and into the bore 18 leading to the grooves 17, where it is discharged upon the surfaces 16 of the face plates.

A pair of spaced-apart longitudinal bars D are arranged substantially parallel with the junction 15 of the face plates B, and are disposed on the lateral edges of the plates opposite this junction. These bars project from the mastic-carrying faces 16 of the face plates, as clearly shown in Figure 6, to limit lateral spreading of the mastic. The lower ends of the longitudinal bars D are pivotally secured by screws 26 to the plates B. The board-engaging edges 27 of these bars are movable relative to the mastic-carrying faces 16 of the plates. The bars D are guided for movement by top lugs 28 projecting from the plates.

At the upper ends of the plates B, I mount a pair of transverse troweling bars E. The outer ends of these bars are bifurcated at 29 to define legs that will telescope into notches 30 formed in the upper ends of the bars D (see Figures 6 and 7). Thus the free ends of the longitudinal bars D are interconnected with the outer ends of the transverse bars E so as to move therewith.

The innermost or adjacent ends 31 of the transverse troweling bars are bevelled at 32 relative to one another (see Figures 5–7, inclusive). An angle-shaped fulcrum bracket 33 has its angled corner edge 34 registering and disposed flush with the junction 15 between the face plates. This bracket is fashioned with an upstanding flange 35 that fits into notches 36 fashioned in the underneath edges of the adjacent ends of the bars E (see Figures 3, 6 and 7).

These flanges 35 retain the adjacent ends 31 of the transverse troweling bars E flush with the junction 15. This is important in order that little or no mastic in the outer layer 14 will be left over the crease 12b of the tape upon advancing the tool longitudinally along the corner joint.

It will be noted that the body of the tool A has a lug 37 at its top grooves 38 therein to receive the adjacent ends 31 of the troweling bars E. An adjustable screw 39 is threaded through the lug 37, and has a tapered end 40 that is inserted between the bevelled ends 32 of the bars E to hold the latter against the fulcrum bracket 33.

While the adjacent ends 31 of the bars E are retained flush with the injunction 15, the outer ends of these bars are guided for movement beneath hook-shaped lugs 41 projecting from the rear of the face plates B.

For the purpose of applying yielding pressure at the interconnected ends of the longitudinal and transverse bars D and E, respectively, to urge all of these bars to project forwardly from the mastic-carrying surfaces 16 of the face plates B, I make use of leaf springs 42. The latter are anchored at their bottom ends by screws 43 to lugs 44 provided on the rear lower sections of the face plates (see Figures 2, 6 and 8). Adjusting screws 45 are threaded through the top parts of the springs and bear against the juncture provided between the upper ends of the longitudinal bars D and the transverse bars E.

Thus it will be apparent that the free upper ends of the mastic-retaining bars D and the outer free ends of the troweling bars E may move against the action of the springs 42 to compensate for any uneven surfaces of the wall boards over which the tool is advanced. During this advancement of the tool, the bars E are disposed at the trailing end thereof, and will trowel off any excess mastic.

Of course, the operator grasping the handle C must hold the junction 15 of the face plates B up against the crease 12b of the tape. In order to reduce the hydrostatic pressure between the tool and the wall boards, and thereby require less effort on the part of the operator, the lower portions of the face plates are cut away, as at 46. Inasmuch as the total areas of these face plates are thus reduced, a corresponding reduction in the hydrostatic pressure will result.

It will be noted from Figures 1, 5, 6 and 7, that the troweling edges 48 of the transverse bars E are concaved slightly lengthwise of these bars. This will leave a slight crown 49 to the final layer of mastic (see Figure 9). The amount of the crown has been greatly exaggerated for the purpose of clarity; in actual practice it amounts to 1/64" to 1/32", sufficient to leave a little more mastic over the tape.

*Summary of operation of first embodiment*

Assuming that the wall boards 10 are supported on studs 47 in the manner shown in Figures 1 and 3, and that an inner layer 11 of mastic and a covering tape 12 has been applied over this inside corner, the operation of my tool A is summarized briefly as follows:

The operator grasps the handle C and moves the tool A into this inside corner, with the junction 15 between the face plates B registering and abutting the crease 12b of the tape. Accordingly, these face plates will confront the two wall boards. Now mastic is forced under pressure through the bore 19 of the handle, and is conveyed through the pipe 20, ball 22, the discharge bore 18 and the horizontal grooves 17 so as to be applied to the mastic-carrying surfaces 16 of the face plates. The longitudinal bars D will limit the lateral spreading of this mastic.

As the tool A is advanced along the corner joint so that the transverse bars E are disposed at the trailing end of the tool, these bars will trowel off any excess mastic, producing the final joint shown in Figure 9. Although the free ends of the bars D and E will yield to compensate for any uneven surfaces of the wall boards, the innermost or adjacent ends 31 of the transverse bars E will be arranged flush with the junction 15 of the plates B at all times. This will prevent mastic from building up over the crease 12b of the tape, which would be apt to crack when it dried.

*Detailed description second embodiment*

Referring to Figures 10, I have illustrated an outside corner therein, which is provided by two wall boards 10'. In this view an inner layer 11' of mastic and longitudinally-folded tape 12' has been applied over the corner joint.

The outside corner tool A' shown in Figures 11 to 16, inclusive, is very similar to the inside corner tool A previously described, excepting for the fact that it is designed for fitting over an outside corner, as suggested in Figure 12.

In its structural arrangements, the tool A' has a pair of angularly-related face plates B' defining a junction 15' therebetween on its inside surface. The mastic-carrying faces 16' of these plates are fashioned with a groove 17' therein from which mastic is discharged. The same tubular handle C, pipe 20, and apertured ball 22 are used for delivering mastic under pressure to a discharge opening 18' communicating with the groove 17'. Also, the same U-shaped clip 24 and screw 25 are utilized for mounting the ball 22 in a seat 23' formed in the rear part of the tool body.

Longitudinally-extending bars D of the same shape as used in the first form of the invention are employed in this modification of the tool. Screws 26 pivotally anchor the lower ends of these bars to the lateral edges of the face plates B', while upper ends of these bars are notched at 30 to receive the bifurcated ends 29' of transverse troweling bars E'.

The innermost ends 31' of the bars E' are disposed flush with the junction 15', and are confined underneath a grooved lug 37' by an angle-shaped fulcrum bracket 33'. As in the first form of the tool, this fulcrum bracket has an upstanding flange 35' that fits into notches 36' provided in adjacent ends of the bars E' (see Figures 11 and 17). Also, the same screw 39 is threaded through the lug 37' from the rear so that its tapered end 40 will be inserted between the bevelled ends 32' of the bars E' to hold the latter up against the fulcrum bracket.

Moreover, it will be observed that the same leaf springs 42 and adjusting screws 45 are utilized for yieldingly urging the interconnected ends of the longitudinal and transverse bars D and E', respectively, forwardly of the mastic-carrying faces 16' of the face plates B'.

In this outside corner tool A' the troweling edges 48' of the transverse bars E' are concaved lengthwise thereof (see Figures 11, 12 and 17). This will leave a slight crown 49' to the outer layer of mastic 14' that overlies the tape 12' (see Figure 10). Again, this crown has been exaggerated.

*Summary of operation of second embodiment*

The operation of the outside corner tool A' is identical with that of the inside corner tool A, excepting that it is applied over the outside corner provided by the wall boards 10', as shown in Figure 12 of the drawings. In this case, the tool A' is applied so that its junction 15' will register with the crease 12b' of the tape.

Mastic is delivered under pressure through the discharge opening 18' into the groove 17', where it will flow to the mastic-carrying surfaces 16' of the face plates B'. The longitudinal bars D limit the lateral spreading of this mastic, while the troweling bars E' will trowel off any excess mastic as the tool A' is advanced by the operator along the outside corner joint. The same thinning out of the mastic layer 14' will occur over the crease of the tape (see Figure 10), and likewise the mastic will be feathered toward its lateral edges 14a' to merge into the surfaces of the wall boards.

I claim:

1. In a mastic-applying and corner finishing tool: a body having a pair of angularly-related face plates providing a junction therebetween and having trailing edges; these plates being adapted to be arranged in confronting relation with two wall boards that define a corner, with the junction of the plates disposed at the corner of the boards; means for applying mastic to those surfaces of the plates that confront the boards; spaced-apart longitudinal bars carried by the plates and substantially paralleling the junction between the latter; these bars projecting from the mastic-carrying surfaces of the plates to limit lateral spreading of the mastic; the longitudinal bars having edges riding against the boards; and transverse troweling bars extending from the junction of the plates along the trailing edges of the plates, and to the longitudinal bars to trowel off excess mastic as the tool is advanced longitudinally along the corner; the longitudinal and transverse bars having wall board engaging edges that overhang those plate surfaces that confront the boards.

2. In a mastic-applying and corner finishing tool: a body having a pair of angularly-related face plates providing a junction therebetween and having trailing edges; these plates being adapted to be arranged in confronting relation with two wall boards that define a corner, with the junction of the plates disposed at the corner of the boards; means for applying mastic to those surfaces of the plates that confront the boards; spaced-apart longitudinal bars carried by the plates and substantially paralleling the junction between the latter; these bars projecting from the mastic-carrying surfaces of the plates to limit lateral spreading of the mastic; the longitudinal bars having edges riding against the boards; transverse troweling bars extending from the junction of the plates, along the trailing edges of the plates, and to the longitudinal bars to trowel off excess mastic as the tool is advanced longitudinally along the corner; the longitudinal and transverse bars having wall board engaging edges that overhang those plate surfaces that confront the boards; and yielding means mounting the longitudinal and transverse bars for movement relative to the mastic-carrying surfaces of the plates.

3. In a mastic-applying and corner finishing tool: a body having a pair of angularly-related face plates providing a junction therebetween and having trailing edges; these plates being adapted to be arranged in confronting relation with two wall boards that define a corner, with the junction of the plates disposed at the corner of the boards; means for applying mastic to those surfaces of the plates that confront the boards; spaced-apart longitudinal bars carried by the plates and substantially paralleling the junction between the latter; these bars projecting from the mastic-carrying surfaces of the plates to limit lateral spreading of the mastic; the longitudinal bars having edges riding against the boards; and transverse troweling bars extending from the junction of the plates, along the trailing edges of the plates, and to the longitudinal bars to trowel off excess mastic as the tool is advanced longitudinally along the corner; the longitudinal and transverse bars having wall board engaging edges that overhang those plate surfaces that confront the boards; these transverse bars having adjacent ends registering with the junction of the plates and positioned flush therewith.

4. In a mastic-applying and corner finishing tool: a body having a pair of angularly-related face plates providing a junction therebetween and having trailing edges; these plates being adapted to be arranged in confronting relation with two wall boards that define a corner, with the junction of the plates disposed at the corner of the boards; means for applying mastic to those surfaces of the plates that confront the boards; spaced-apart longitudinal bars carried by the plates and substantially paralleling the junction between the latter; these bars projecting from the mastic-carrying surfaces of the plates to limit lateral spreading of the mastic; the longitudinal bars having edges riding against the boards; transverse troweling bars extending from the junction of the plates, along the trailing edges of the plates, and to the longitudinal bars to trowel off excess mastic as the tool is advanced longitudinally along the corner; these transverse bars having adjacent ends registering with the junction of the plates and positioned flush therewith; yielding means mounting the longitudinal and transverse bars at their place of intersection for movement in planes at right angles relative to the mastic-carrying surfaces of the plates to vary the projecting of these bars beyond said surfaces; and means retaining the adjacent ends of the transverse bars flush with the junction of the plates during movement of these bars.

5. In a mastic-applying and corner finishing tool: a body having a pair of angularly-related face plates providing a junction therebetween; these plates being adapted to be arranged in confronting relation with two wall boards that define a corner, with the junction of the plates disposed at the corner of the boards; means for applying mastic to those surfaces of the plates that confront the boards; spaced-apart longitudinal bars arranged at those lateral edges of the plates opposite to the junction between these plates; means pivotally securing one end of each longitudinal bar to that plate adjacent thereto, leaving the other end of each longitudinal bar free for movement relative to the mastic-carrying surface of its plate; these bars projecting from the mastic-carrying surfaces of the plates to limit lateral spreading of the mastic; transverse troweling bars extending from the junction of the plates to the longitudinal bars to trowel off excess mastic as the tool is advanced longitudinally along the corner; these transverse bars having adjacent ends registering with the junction of the plates and disposed flush therewith, and further having their outer ends interconnected to the free ends of the longitudinal bars so as to move therewith.

6. In a mastic-applying and corner finishing tool: a body having a pair of angularly-related face plates providing a junction therebetween; these plates being adapted to be arranged in confronting relation with two wall boards that define a corner, with the junction of the plates disposed at the corner of the boards; means for applying mastic to those surfaces of the plates that confront the boards; spaced-apart longitudinal bars arranged at those lateral edges of the plates opposite to the junction between these plates; means pivotally securing one end of each longitudinal bar to that plate adjacent thereto, leaving the other end of each longitudinal bar free for movement relative to the mastic-carrying surface of its plate; these bars projecting from the mastic-carrying surfaces of the plates to limit lateral spreading of the mastic; transverse troweling bars extending from the junction of the plates to the longitudinal bars to trowel off excess mastic as the tool is advanced longitudinally along the corner; these transverse bars having adjacent ends registering with the junction of the plates and disposed flush therewith, and further having their outer ends interconnected to the free ends of the longitudinal bars so as to move therewith; and means retaining the adjacent ends of the transverse bars flush with the junction of the plates during movement of these bars.

7. In a mastic-applying and corner finishing tool: a body having a pair of angularly-related face plates providing a junction therebetween; these plates being adapted to be arranged in confronting relation with two wall boards that define a corner, with the junction of the plates disposed at the corner of the boards; means for applying mastic to those surfaces of the plates that confront the boards; spaced-apart longitudinal bars arranged at those lateral edges of the plates opposite to the junction between these plates; means pivotally securing one end of each longitudinal bar to that plate adjacent thereto, leaving the other end of each longitudinal bar free for movement relative to the mastic-carrying surface of its plate; these bars projecting from the mastic-carrying surfaces of the plates to limit lateral spreading of the mastic; transverse troweling bars extending from the junction of the plates to the longitudinal bars to trowel off excess mastic as the tool is advanced longitudinally along the corner; these transverse bars having adjacent ends registering with the junction of the plates and disposed flush therewith, and further having their outer ends interconnected to the free ends of the longitudinal bars so as to move therewith; means retaining the adjacent ends of the transverse bars flush with the junction of the plates during movement of these bars; and yielding means for applying pressure at the interconnected ends of the longitudinal and transverse bars to urge all of these bars to project forwardly from the mastic-carrying surfaces of the plates.

8. In a mastic-applying and corner finishing tool: a body having a pair of angularly-related face plates providing a junction therebetween; these plates being adapted to be arranged in confronting relation with two wall boards that define a corner, with the junction of the plates disposed at the corner of the boards; means for applying mastic to those surfaces of the plates that confront the boards; spaced-apart longitudinal bars arranged at those lateral edges of the plates opposite to the junction between these plates; means pivotally securing one end of each longitudinal bar to that plate adjacent thereto, leaving the other end of each longitudinal bar free for movement relative to the mastic-carrying surface of its plate; these bars projecting from the mastic-carrying surfaces of the plates to limit lateral spreading of the mastic; transverse troweling bars extending from the junction of the plates to the longitudinal bars to trowel off excess mastic as the tool is advanced longitudinally along the corner; these transverse bars having adjacent ends registering with the junction of the plates and disposed flush therewith, and further having their outer ends interconnected to the free ends of the longitudinal bars so as to move therewith; the body having a lug with grooves therein receiving the adjacent ends of the transverse bars; a fulcrum bracket engaging with notches in the adjacent ends of the transverse bars to retain these ends flush with the junction of the plates during movement of these bars.

9. In a mastic-applying and corner finishing tool: a body having a pair of angularly-related face plates providing a junction therebetween; these plates being adapted to be arranged in confronting relation with two wall boards that define a corner, with the junction of the plates disposed at the corner of the boards; means for applying mastic to those surfaces of the plates that confront the boards; spaced-apart longitudinal bars arranged at those lateral edges of the plates opposite to the junction between these plates; means pivotally securing one end of each longitudinal bar to that plate adjacent thereto, leaving the other end of each longitudinal bar free for movement relative to the mastic-carrying surface of its plate; these bars projecting from the mastic-carrying surfaces of the plates to limit lateral spreading of the mastic; transverse troweling bars extending from the junction of the plates to the longitudinal bars to trowel off excess mastic as the tool is advanced longitudinally along the corner; these transverse bars having adjacent ends registering with the junction of the plates and disposed flush therewith, and further having their outer ends interconnected to the free ends of the longitudinal bars so as to move therewith; the body having a lug with grooves therein receiving the adjacent ends of the transverse bars; a fulcrum bracket engaging with notches in the adjacent ends of the transverse bars to retain these ends flush with the junction of the plates during movement of these bars; the adjacent ends of these transverse bars being bevelled relative to one another; and an adjustable screw having a tapered end inserted between the bevelled ends of the transverse bars to hold the latter against the fulcrum bracket.

10. In a mastic-applying and corner finishing tool: a body having a pair of angularly-related face plates providing a junction therebetween and having trailing edges; these plates being adapted to be arranged in confronting relation with two wall boards that define a corner, with the junction of the plates disposed at the corner of the boards; means for applying mastic to those surfaces of the plates that confront the boards; spaced-apart longitudinal bars carried by the plates and substantially paralleling the junction between the latter; these bars projecting from the mastic-carrying surfaces of the plates, along the trailing edges of the plates, and to limit lateral spreading of the mastic; the longitudinal bars having edges riding against the boards; and transverse troweling bars extending from the junction of the plates to the longitudinal bars to trowel off excess mastic as the tool is advanced longitudinally along the corner; the longitudinal and transverse bars having wall board engaging edges that overhang those plate surfaces that confront the boards; these transverse bars having troweling edges concaved lengthwise thereof to leave a crown to the mastic.

ROBERT G. AMES.

REFERENCES CITED

The following references are of record in the file of this patent:

UNITED STATES PATENTS

| Number | Name | Date |
| --- | --- | --- |
| 2,413,684 | Ames | Jan. 7, 1947 |